United States Patent
Depaoli et al.

(10) Patent No.: US 11,313,271 B2
(45) Date of Patent: Apr. 26, 2022

(54) WASTEGATE ASSEMBLY

(71) Applicant: BorgWarner Inc., Auburn Hills, MI (US)

(72) Inventors: Dominic William Depaoli, Horse Shoe, NC (US); Aaron Date, Asheville, NC (US); Michael Daniel Cola, Fletcher, NC (US); Georg Scholz, Wöllstein (DE); Marc Werner, Bockenau (DE); Christian Cossmann, Kaiserslautern (DE); Jakob Penth, Saarbrücken (DE); Christoph Müller, Kirchheimbolanden (DE); Ravi Patil, Kirchheimbolanden (DE)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 17/019,820

(22) Filed: Sep. 14, 2020

(65) Prior Publication Data
US 2021/0087968 A1  Mar. 25, 2021

Related U.S. Application Data

(60) Provisional application No. 62/903,169, filed on Sep. 20, 2019.

(51) Int. Cl.
*F02B 37/18* (2006.01)
*F16K 47/02* (2006.01)
*F16K 1/20* (2006.01)

(52) U.S. Cl.
CPC .............. *F02B 37/18* (2013.01); *F16K 1/20* (2013.01); *F16K 47/023* (2013.01)

(58) Field of Classification Search
CPC ...... F02B 37/18; F02B 37/183; F02B 37/186; F16K 1/20; F16K 47/023; F01D 17/10; F02C 6/12

(Continued)

(56) References Cited

U.S. PATENT DOCUMENTS 2,565,108 A * 8/1951 Zahodiakin ............. F16F 1/324
                                                    267/162
5,112,178 A * 5/1992 Overhues ................ F16B 39/24
                                                    267/161

(Continued)

FOREIGN PATENT DOCUMENTS

DE     102010038908 A1    2/2012
DE     102011076361 A1    11/2012

(Continued)

OTHER PUBLICATIONS

International Search Report for Application No. PCT/US2019/052079 dated Jan. 2, 2020, 2 pages.

(Continued)

*Primary Examiner* — Thai Ba Trieu
(74) *Attorney, Agent, or Firm* — Howard & Howard Attorneys PLLC

(57) ABSTRACT

A wastegate assembly for controlling flow of exhaust gas includes a valve element having a valve body and a valve shaft. The wastegate assembly further includes a spindle. The wastegate assembly further includes a washer coupled to the valve shaft and spaced from the spindle for securing the spindle to the valve shaft. A plurality of cup springs is disposed between the spindle and the washer. The plurality of cup springs includes at least a first cup spring and a second cup spring, with the first cup spring supported on the spindle head and the second cup spring orientated substantially identical to the first cup spring and disposed directly on the first cup spring.

20 Claims, 9 Drawing Sheets

(58) Field of Classification Search
USPC .......................................................... 60/602
See application file for complete search history.

(56) References Cited

U.S. PATENT DOCUMENTS

| | | | | |
|---|---|---|---|---|
| 5,282,710 | A * | 2/1994 | Triesethau | ............ F16B 43/001 |
| | | | | 411/155 |
| 8,500,108 | B2 | 8/2013 | Rode | |
| 8,820,709 | B2 | 9/2014 | Lombard et al. | |
| 9,127,590 | B2 | 9/2015 | Schoenherr et al. | |
| 9,222,406 | B2 | 12/2015 | Lombard et al. | |
| 9,464,565 | B2 * | 10/2016 | Yamaguchi | ............ F02B 37/186 |
| 9,593,624 | B2 | 3/2017 | Segawa | |
| 9,631,628 | B2 | 4/2017 | Takahashi et al. | |
| 10,024,229 | B2 | 7/2018 | Byon | |
| 10,302,010 | B2 | 5/2019 | Diemer et al. | |
| 10,605,115 | B2 | 3/2020 | Iwata | |
| 10,920,660 | B2 | 2/2021 | Schawer et al. | |
| 2011/0037210 | A1 | 2/2011 | Rode | |
| 2012/0234002 | A1 | 9/2012 | Lombard et al. | |
| 2013/0189072 | A1 | 7/2013 | Wade | |
| 2014/0366530 | A1 | 12/2014 | Murayama et al. | |
| 2015/0285133 | A1 | 10/2015 | Byon | |
| 2018/0080370 | A1 | 3/2018 | Genin et al. | |
| 2018/0094573 | A1 | 4/2018 | Schoenherr et al. | |
| 2018/0223727 | A1 | 8/2018 | Nakajima | |
| 2018/0230848 | A1 | 8/2018 | Iwata | |
| 2019/0003376 | A1 | 1/2019 | Schawer et al. | |
| 2019/0136753 | A1 * | 5/2019 | Li | ........................ F02B 37/186 |
| 2019/0195270 | A1 | 6/2019 | Lee et al. | |
| 2021/0033001 | A1 * | 2/2021 | Kato | .................... F02B 37/186 |
| 2021/0108558 | A1 * | 4/2021 | Huh | ...................... F02B 37/183 |

FOREIGN PATENT DOCUMENTS

| | | | | |
|---|---|---|---|---|
| DE | 102013200832 | A1 | 7/2013 | |
| DE | 102013200065 | A1 | 7/2014 | |
| DE | 102016100900 | A1 | 7/2017 | |
| DE | 202017105056 | U1 | 9/2017 | |
| DE | 202018002846 | U1 | 6/2018 | |
| DE | 102017202137 | A1 | 8/2018 | |
| DE | 102018103283 | A1 | 8/2018 | |
| DE | 102018204251 | A1 * | 9/2019 | ............ F02B 37/183 |
| EP | 2508730 | B1 | 6/2014 | |
| EP | 3211197 | A1 | 8/2017 | |
| JP | S61033923 | U | 3/1986 | |
| JP | 2006097693 | A | 4/2006 | |
| JP | 2013155687 | A | 8/2013 | |
| WO | 2010135104 | A2 | 11/2010 | |
| WO | 2013133371 | A1 | 9/2013 | |
| WO | 2014011468 | A1 | 1/2014 | |
| WO | 2019072486 | A1 | 4/2019 | |
| WO | 2019105853 | A1 | 6/2019 | |

OTHER PUBLICATIONS

International Search Report for Application No. PCT/US2019/052145 dated Dec. 4, 2019, 3 pages.

U.S. Appl. No. 17/269,362, filed Feb. 18, 2021.

U.S. Appl. No. 17/271,911, filed Feb. 26, 2021.

English language abstract and machine-assisted English translation for DE 10 2010 038 908 A1 extracted from espacenet.com database on Mar. 1, 2021, 7 pages.

English language abstract and machine-assisted English translation for DE 10 2011 076 361 A1 extracted from espacenet.com database on Mar. 1, 2021, 10 pages.

Machine-assisted English language abstract for DE 10 2013 200 832 A1 extracted from espacenet.com database on Mar. 1, 2021, 2 pages.

English language abstract and machine-assisted English translation for DE 10 2013 200 065 A1 extracted from espacenet.com database on Mar. 1, 2021, 11 pages.

Machine-assisted English language abstract for DE 10 2016 100 900 A1 extracted from espacenet.com database on Mar. 1, 2021, 2 pages.

Machine-assisted English language abstract and machine-assisted English translation for DE 20 2017 105 056 U1 extracted from espacenet.com database on Mar. 1, 2021, 13 pages.

Machine-assisted English language abstract and machine-assisted English translation for DE 20 2018 002 846 U1 extracted from espacenet.com database on Mar. 1, 2021, 14 pages.

English language abstract for DE 10 2018 103 283 A1 extracted from espacenet.com database on Mar. 1, 2021, 1 page.

English language abstract and machine-assisted English translation for DE 10 2017 202 137 A1 extracted from espacenet.com database on Mar. 1, 2021, 15 pages.

Machine-assisted English language abstract for EP 3 211 197 A1 extracted from espacenet.com database on Mar. 1, 2021, 2 pages.

Machine-assisted English language translation for JPS 61-033923 U extracted from espacenet.com database on Mar. 4, 2021, 3 pages.

English language abstract and machine-assisted English translation for JP 2006-047693 A extracted from espacenet.com database on Mar. 1, 2021, 11 pages.

English language abstract for JP 2013-155687 A extracted from espacenet.com database on Mar. 1, 2021, 1 page.

English language abstract for WO 2013/133371 A1 extracted from espacenet.com database on Mar. 1, 2021, 2 pages.

English language abstract for WO 2019/072486 A1 extracted from espacenet.com database on Mar. 1, 2021, 2 pages.

English language abstract and machine-assisted English translation for WO 2019/105853 A1DE 10 2017 202 137 A1 extracted from espacenet.com database on Mar. 1, 2021, 15 pages.

* cited by examiner

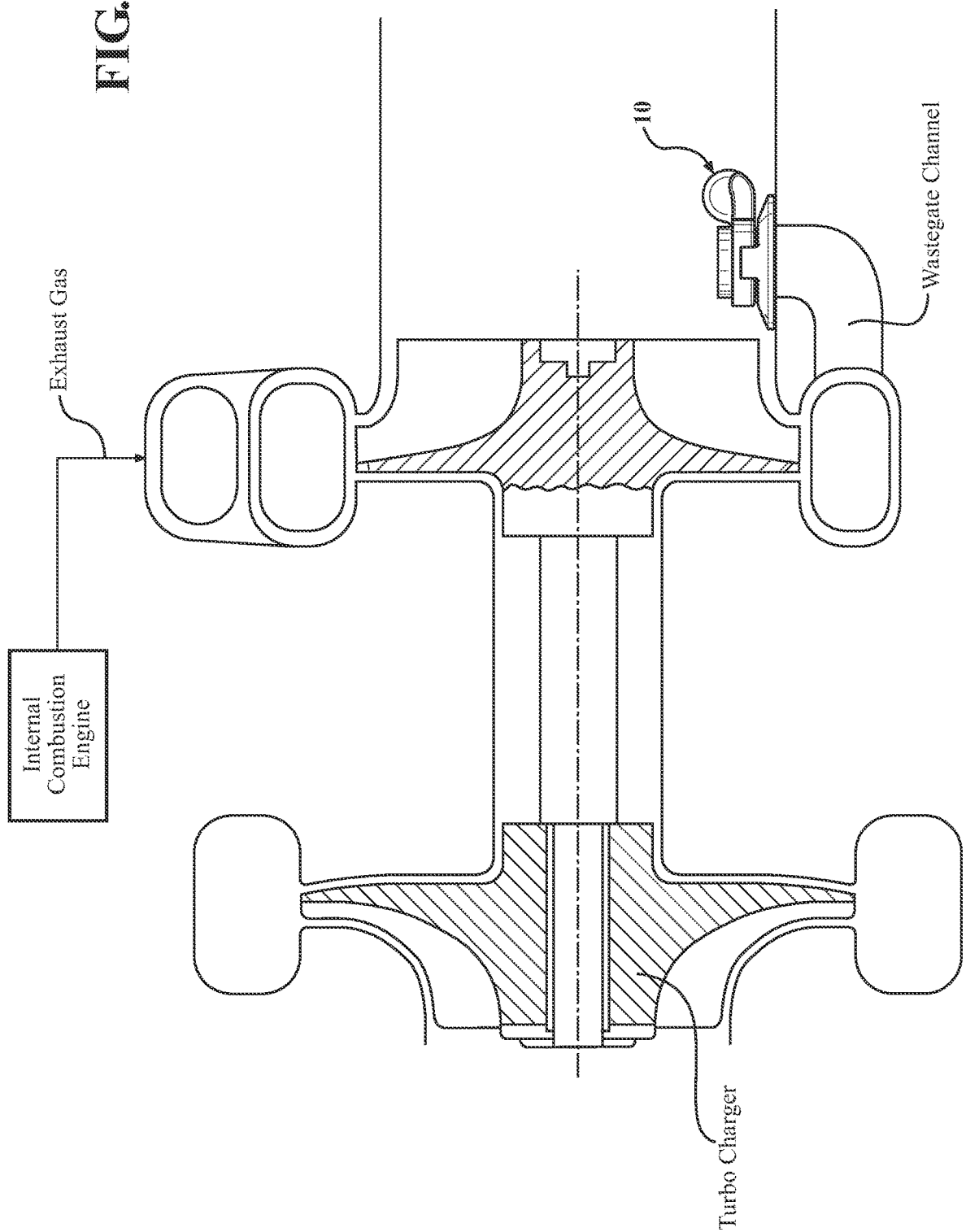

WASTEGATE ASSEMBLY

CROSS REFERENCE TO RELATED APPLICATIONS

This application claims priority to, and all the benefits of, U.S. Provisional Patent Application No. 62/903,169 filed on Sep. 20, 2019, the disclosure of which is hereby incorporated by reference in its entirety.

FIELD OF THE DISCLOSURE

The following disclosure is generally directed to a wastegate assembly for a turbocharger.

BACKGROUND OF THE DISCLOSURE

Wastegate assemblies are exposed to high temperatures and corrosive exhaust gas. The high temperatures, corrosive exhaust gas, and prolonged use may degrade certain components of the wastegate assembly and thereby reduce the service life of the wastegate assembly. This degradation may be particularly acute when the wastegate assembly includes a biasing member (e.g. a spring). Thus, there remains an opportunity to develop a wastegate assembly including a biasing member that has improved durability and service life.

SUMMARY OF THE DISCLOSURE AND ADVANTAGES

A wastegate assembly for controlling flow of exhaust gas from an internal combustion engine and through a wastegate channel of a turbocharger is disclosed herein. The wastegate includes a valve element having a valve body and a valve shaft extending along an axis and away from the valve body. The valve element is moveable between a first position and a second position to control the flow of exhaust gas through the wastegate channel of the turbocharger. The wastegate assembly further includes a spindle having a head defining an opening for receiving the valve shaft and for moving the valve element between the first and second positions. The wastegate assembly further includes a washer coupled to the valve shaft and spaced from the spindle along the axis such that the spindle is disposed between the valve body and the washer for securing the spindle to the valve shaft. A plurality of cup springs is disposed between the spindle and the washer. The plurality of cup springs includes at least a first cup spring and a second cup spring, with the first cup spring supported on the spindle head and the second cup spring orientated substantially identical to the first cup spring and disposed directly on the first cup spring. Including at least the first and second cup springs in this orientation increases the service life of the plurality of cup springs as compared to a proportionately sized single cup spring.

BRIEF DESCRIPTION OF THE DRAWINGS

Advantages of the present disclosure will be readily appreciated as the same becomes better understood by reference to the following detailed description when considered in connection with the accompanying drawings.

FIG. 11 is a schematic representation of a wastegate assembly for controlling the flow of exhaust gas from an internal combustion engine and through a wastegate channel of a turbocharger, with the representative turbocharger shown in cross-section.

DETAILED DESCRIPTION

In exhaust gas turbocharging, some of the exhaust gas flow, which would normally be exhausted to the environment, is used to drive a turbine. The turbine includes a turbine wheel that is mounted on a shaft and is rotatably driven by exhaust gas flow. The turbocharger returns some of this normally-wasted exhaust gas energy back into the engine, contributing to the engine's efficiency and saving fuel. A compressor, which is driven by the turbine, draws in filtered ambient air, compresses it, and then supplies the compressed air to the engine. The compressor includes a compressor wheel that is mounted on the same shaft so that rotation of the turbine wheel causes rotation of the compressor wheel.

This disclosure focuses on a wastegate assembly 10 for selectively bypassing a portion of the exhaust gas. By selectively allowing exhaust gas to bypass the turbine wheel, the wastegate assembly 10 selectively reduces the turbocharger's output (or boost). Thus, the wastegate assembly 10 regulates exhaust gas flow and ensures that the turbine wheel is spun at a desirable speed. Said differently, the wastegate assembly 10 regulates exhaust gas flow to prevent the turbine wheel from being spun at an undesirable speed.

A turbocharger with the wastegate assembly 10 often has an actuator (e.g. a mechanical actuator) for controlling the wastegate assembly 10. In other words, the actuator moves the wastegate assembly 10 between a first position and a second position. The first position is the closed position, which allows the full volume of exhaust gas to pass through to the turbocharger. The second position is an open position, which may permit the full volume of exhaust gas to bypass the turbocharger. Of course, the actuator my also position the wastegate assembly 10 in a position between the first and second position to bypass a portion of the volume of exhaust gas (e.g. 30% by volume).

Figure 1:
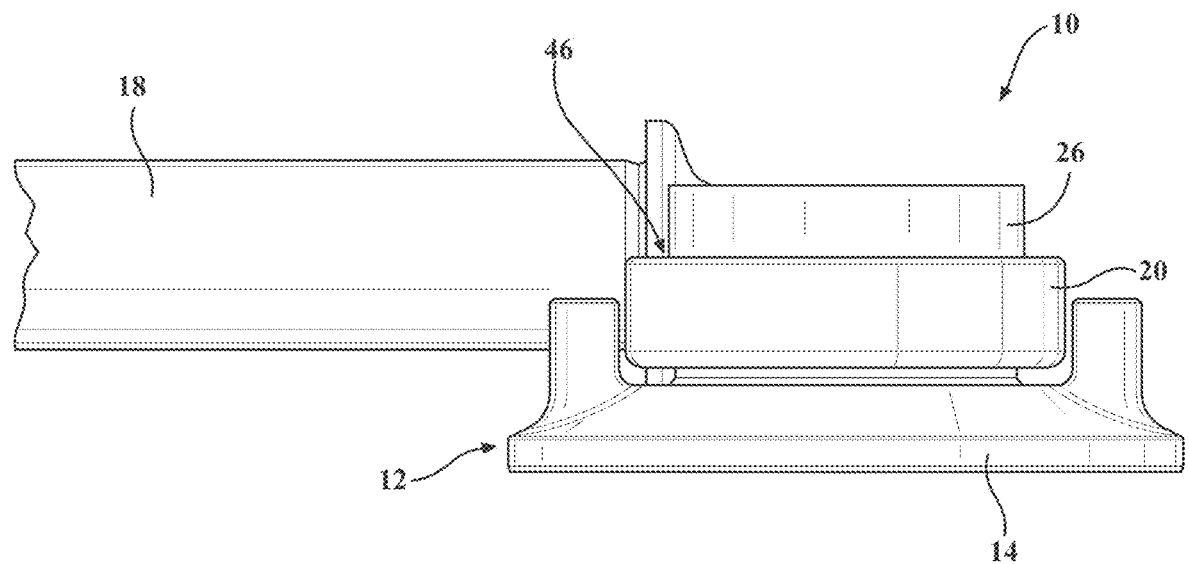
FIG. 1 is a side view of a wastegate assembly.
Figure 2:
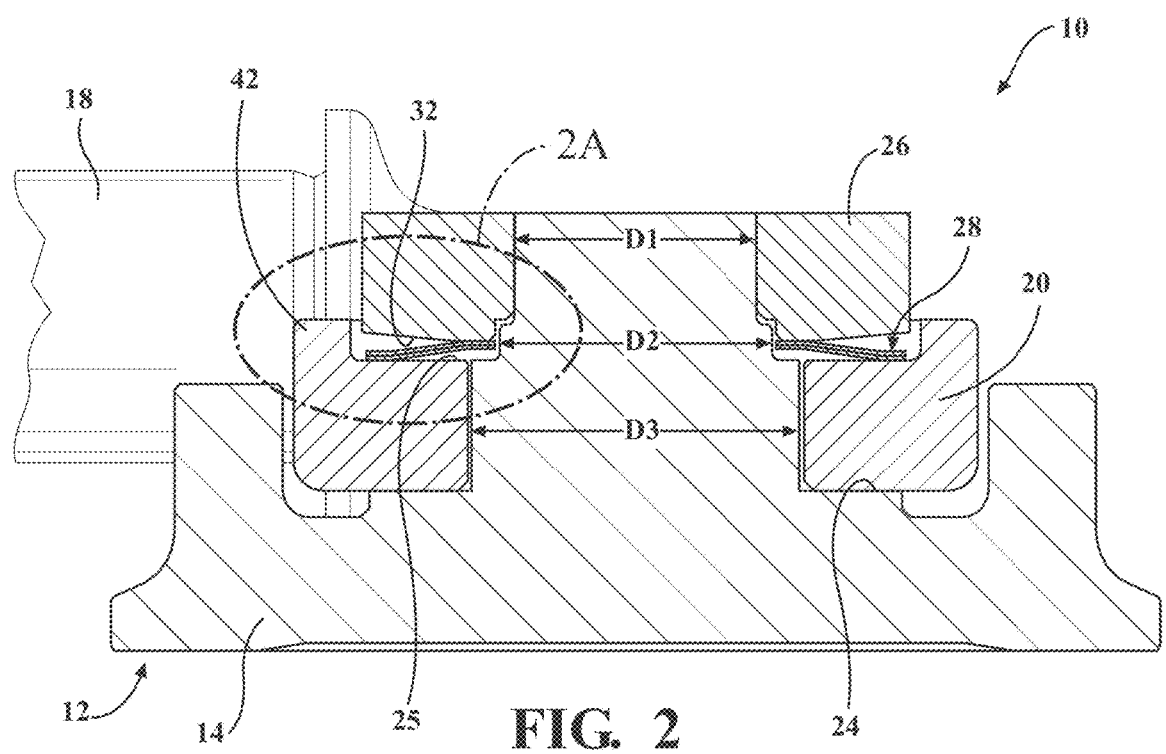
FIG. 2 is a partial cross-sectional view of an embodiment of the wastegate assembly with a spindle head, a washer, two cup springs, and a valve element shown in cross-section.
Figure 3:
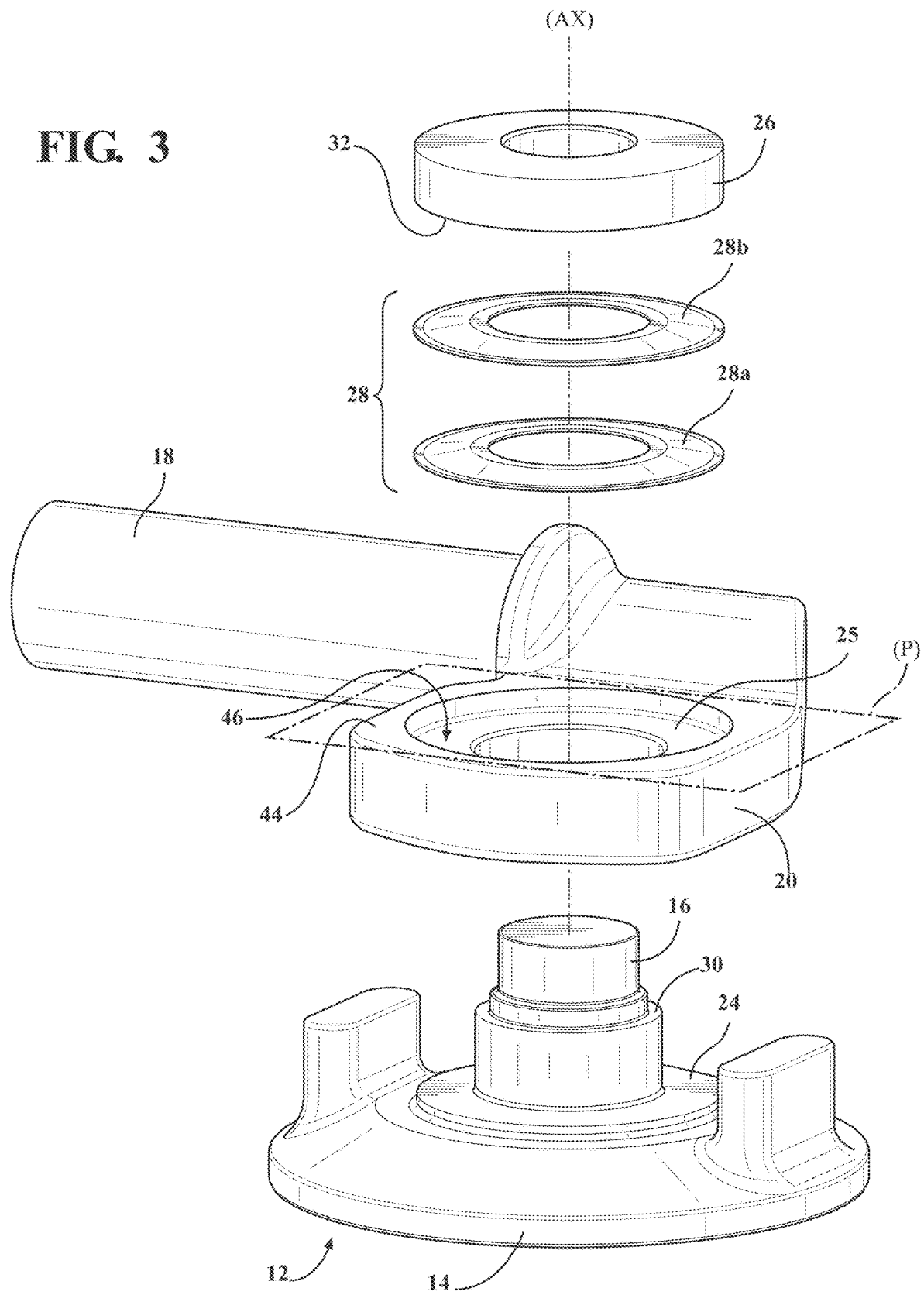
FIG. 3 is an exploded view of the embodiment of the wastegate assembly shown in FIG. 2.
Figure 4:
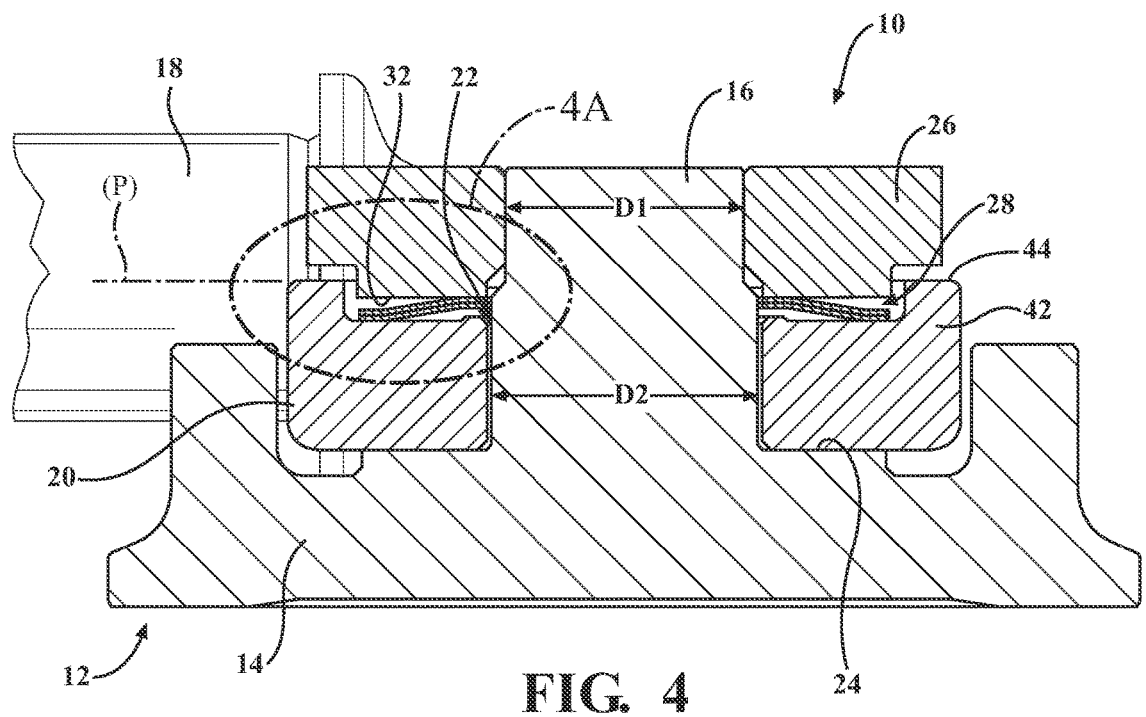
FIG. 4 is a partial cross-sectional view of another embodiment of the wastegate assembly with a spindle head, a washer, two cup springs, and a valve element shown in cross-section.
Figure 5:
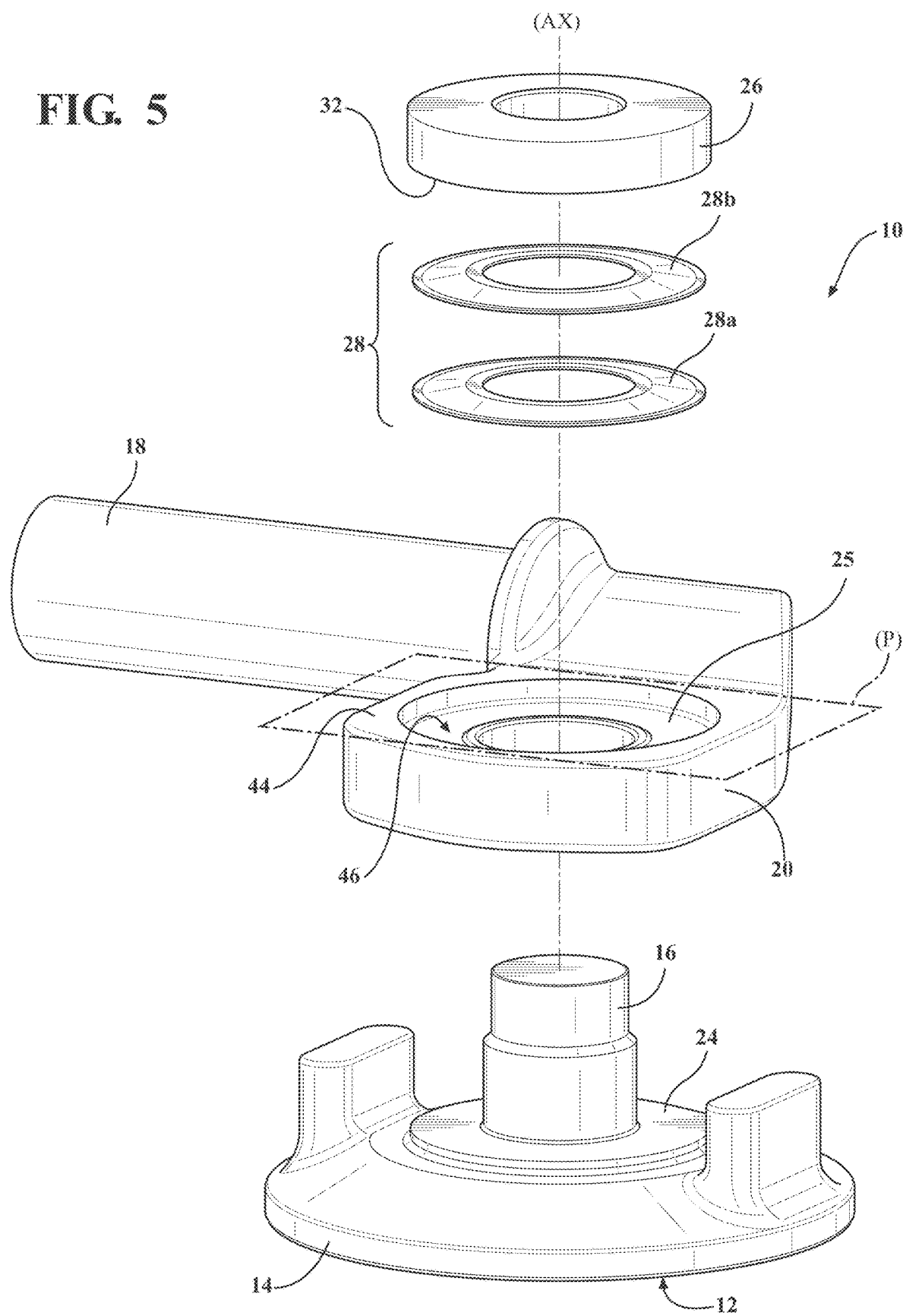
FIG. 5 is an exploded view of the embodiment of the wastegate assembly shown in FIG. 4.

As shown in FIGS. 1-5, the wastegate assembly 10 includes a valve element 12 having a valve body 14. The valve element 12 also includes a valve shaft 16 extending away from the valve body 14. As best shown in FIGS. 3 and 5, the valve shaft 16 extends along an axis (AX). When the wastegate assembly 10 is in the first position, the valve element 12 prevents exhaust gas from bypassing the turbocharger. In contrast, when the wastegate assembly 10 is in the second position, the valve element 12 is positioned to allow at least a portion of exhaust gas to bypass the turbocharger.

As further shown in FIGS. 1-5, the wastegate assembly 10 also includes a spindle 18, which is also commonly referred to as a lever. The spindle 18 is typically coupled to the actuator for moving the wastegate assembly 10 between the first and second positions. As best shown in FIG. 4, the spindle 18 includes a head 20 defining an opening 22 for receiving the valve shaft 16. Because the spindle 18 receives the valve shaft 16, when the actuator acts upon the spindle 18, the valve element 12 is moved through its connection to the spindle 18. As shown in FIGS. 2-5, typically the spindle 18 abuts the valve element 12 at a top surface 24 of the valve body 14. Although not required, as shown throughout FIGS. 2-5, the spindle may include a flat surface 25 facing the washer 26. The flat surface 25 of the spindle head 20 extends generally perpendicular to the axis (AX).

As shown in FIG. 2, the washer 26 is coupled to the valve shaft 16 and spaced from the spindle 18 along the axis (AX, FIG. 3) such that the spindle head 20 is disposed between the valve body 14 and the washer 26 for securing the spindle 18 to the valve shaft 16. Typically, the washer 26 is welded to the valve shaft 16. Of course, the washer 26 may be attached to the valve shaft 16 by any suitable means, such as, for example, a compression fit or mechanical interlock. It is to be appreciated that the washer 26 secures the spindle 18 to the valve shaft 16 because coupling the washer 26 to the valve shaft 16 effectively sandwiches the spindle head 20 between the valve body 14 and the washer 26. Said differently, because the washer 26 is attached to the valve shaft 16 and sandwiches the spindle head 20 between itself 26 and the valve element 12, the washer 26 effectively secures the spindle 18 to the valve shaft 16 despite the fact that the spindle 18 itself may not be directly or absolutely fixed to the valve shaft 16 via a weld or some other form of mechanical attachment.

As shown throughout FIGS. 2-5, the wastegate assembly 10 further includes a plurality of cup springs 28 disposed between the spindle head 20 and the washer 26. The plurality of cup springs 28 typically reduces or eliminates vibration/rattling or any sound resulting therefrom that would otherwise occur from the spindle head 20 vibrating and/or moving between the valve element 12 and the washer 26.

The plurality of cup springs 28 includes at least a first and a second cup spring 28a, 28b. The first cup spring 28a is supported by the spindle head 20. The second cup spring 28b is not supported on the spindle head 20. Instead, the second cup spring 28b is orientated substantially identical to the first cup spring 28a and disposed directly on and supported by the first cup spring 28a. For the purposes of this disclosure, substantially identical means that the first and second cup springs 28a, 28b exert a biasing force in the same direction and are arranged in the same orientation. Typically, the first cup spring 28a and the second cup spring 28b are identical (i.e., are the same type of cup spring). In other words, because the first and second cup springs 28a, 28b are typically identical, disposing the second cup spring 28b on the first cup spring 28a results in a stacked configuration, which is may also be referred to as a parallel configuration.

Typically, each cup spring in the plurality of cup springs 28 are not physically secured to each other (e.g. by a weld or another mechanical connection). Suitable cup springs are disclosed in U.S. Pat. No. 9,127,590, which is hereby incorporated by reference in its entirety. It should also be appreciated that although two cup springs are shown in FIGS. 2-5, the plurality of cup springs 28 may include more than two cup springs. For example, the plurality of cup springs 28 may include three, four, five, six, or even seven cup springs. In embodiments with two cup springs, the plurality of cup springs 28 may also be referred to as dual cup springs. In embodiments with the plurality of cup springs 28 including more than two cup springs, each additional cup spring is oriented substantially identical to the first cup spring 28a and disposed directly on an adjacent cup spring. For example, when the plurality of cup springs 28 includes the first and second cups springs 28a, 28b and further include a third cup spring, the first cup spring 28a is disposed on the flat surface 25 of the spindle head 20 and around the valve shaft 16, the second cup spring 28b is oriented in a substantially identical manner and disposed on the first cup spring 28a and the third cup spring is oriented in a substantially identical manner to the first and second cup springs 28a, 28b and disposed directly on the second cup spring 28b.

Including the plurality of cup springs 28 is advantageous because the first cup spring 28a is thermally protected and shielded from exhaust gas by the second cup spring 28b. Similarly, if more than two cup springs are included, the second cup spring 28b is thermally protected and shielded from exhaust gas by the third cup spring. This thermal protection and shielding advantageously results in reduced spring relaxation and a prolonged service life, in comparison to the inclusion of a single cup spring, even if the single cup spring is similarly sized to the plurality of cup springs 28. In particular, the oxidation of the first cup spring 28a will be improved compared to a single cup spring of comparable thickness because of this shielding. In addition, the plurality of cup springs 28 in this orientation has an overall spring coefficient that is twice the amount of a single cup spring. For a given travel, the max stress principle in each spring is half of the normal value for this configuration. Accordingly, the relaxation performance shows an improvement of over 50%. Additionally, the wear in each contacting area is reduced to a minimum, because the plurality of the spring is producing a max amount of frictional work in each layer. The stability of the wastegate assembly 10 regarding deflection is better compared to conventional systems not including the plurality of cup springs 28. Testing data demonstrating the improved performance of the wastegate assembly 10 including the plurality of cup springs 28 is provided in Appendix A.

Referring back to the valve shaft 16, the valve shaft 16 may have various configurations. The valve shaft 16 typically has a circular cross-sectional shape. The diameter of the valve shaft 16 may advantageously vary to assist with the assembly of the wastegate assembly 10. For example, as shown in FIG. 2, the valve shaft 16 may have a first diameter (D1) about the washer 26 and a second diameter (D2) about the spindle head 20 with the second diameter (D2) being relatively larger than the first diameter (D1). This configuration assists with assembling and locating the spindle head 20, the plurality of cup springs 28, and the washer 26 about the valve shaft 16. For example, when the opening 22 of the spindle head 20 is initially disposed around the valve shaft 16, the diameter of the valve shaft 16 is the first diameter (D1) (i.e., the smaller of the diameters), which easily allows the opening 22 to be disposed around the valve shaft 16.

Figure 6:
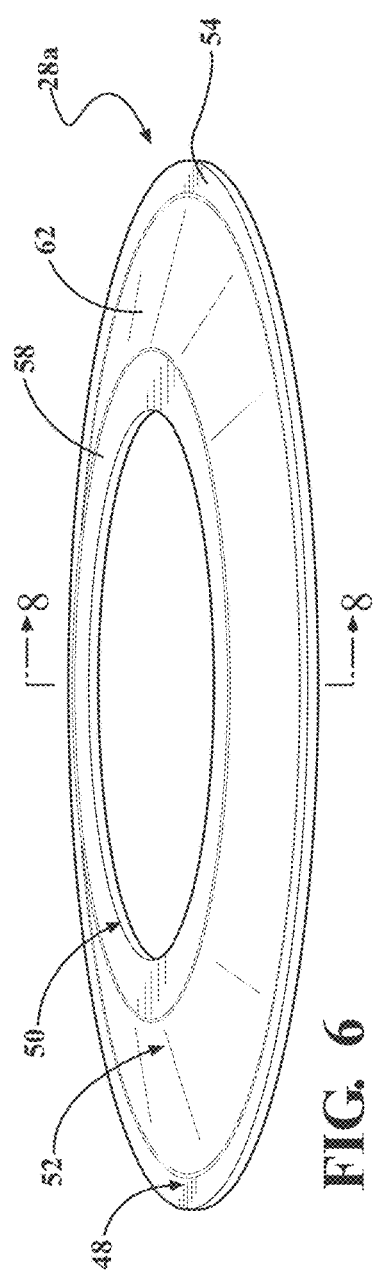
FIG. 6 is a top perspective view of a cup spring.
Figure 7:
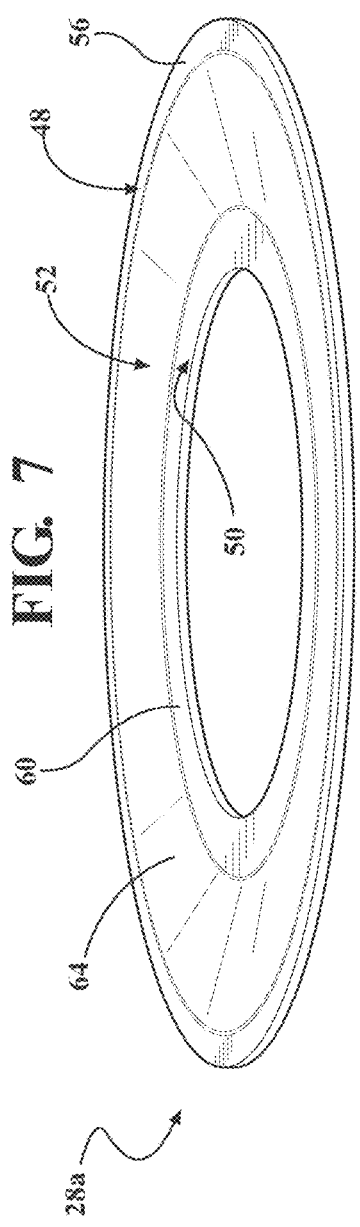
FIG. 7 is a bottom perspective view of the cup spring.
Figure 8:
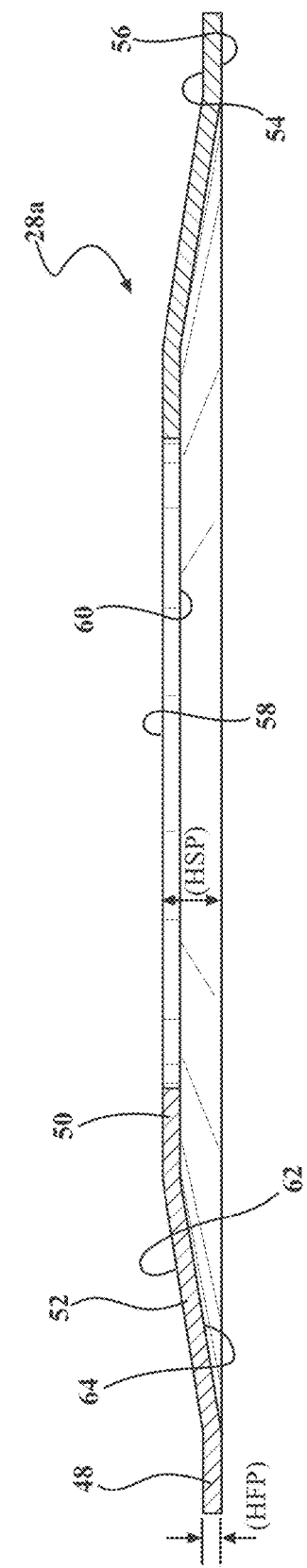
FIG. 8 is a cross-sectional view of the cup spring.

Referring back to the plurality of cup springs 28, in certain embodiments, as best shown in FIGS. 6-8, each cup spring in the plurality of cup springs 28 includes at least 3 distinct regions, a first plateau 48, a second plateau 50 and a riser 52.

The first plateau 48 is generally circular and typically has a constant thickness. In other words, the first plateau 48 is typically disc-like. The first plateau 48 includes a first plateau upper surface 54 and a first plateau bottom surface 56. The first plateau upper surface 54 faces the washer 26. The first plateau bottom surface 56 is opposite from the first plateau upper surface 54. In other words, the first plateau upper surface 54 is spaced from the first plateau bottom surface 56 by the thickness of the first plateau 48. The first plateau bottom surface 56 faces the spindle head 20. The first plateau upper and bottom surfaces 54, 56 may extend parallel to each other or may be formed as concave or convex structures. Although not required, the first plateau 48 and second plateau 50 may extend in planes that are parallel to each other.

Similar to the first plateau 48, the second plateau 50 is generally circular and typically has a constant thickness. In other words, the second plateau 50 is typically disc-like. However, if desired the thickness of either the first or second plateaus 48, 50 may vary. The second plateau 50 includes a second plateau upper surface 58 and a second plateau bottom surface 60 with the second plateau upper surface 58 facing the washer 26 and the second plateau bottom surface 60 opposite the second plateau upper surface 58 and facing the spindle head 20.

The riser 52 extends from the first plateau 48 to the second plateau 50. In other words, the riser 52 connects the first and second plateaus 48, 50. Typically, the height of the cup spring increases as the riser 52 extends from the first plateau 48 to the second plateau 50. Said differently, as best shown in FIG. 8, the height (HSP) of the cup spring at the second plateau 50 is great than the height (HFP) of the cup spring at the first plateau 48. The thickness of the riser 52 may be constant or vary. The height of the cup spring may increase linearly as the riser 52 extends from the first plateau 48 to the second plateau 50. Alternatively, when the riser 52 has a concave or convex geometry, the height of the cup spring may increase non-linearly as the riser 52 extends from the first plateau 48 to the second plateau 50. The height of the cup spring may also increase non-linearly when the riser extends in a stepped configuration, sinusoidal configuration, or other geometry. Typically, the height of the second plateau 50 is also the height of the cup spring, itself.

Similar to the first and second plateaus 48, 50, the riser 52 has an upper riser surface 62 extending from the first plateau upper surface 54 to the second plateau upper surface 58 and a bottom riser surface 64 extending from the first plateau bottom surface 56 to the second plateau bottom surface 60.

In certain embodiments, the second plateau upper surface 58 of the second cup spring 28b contacts the washer 26 but the first plateau upper surface 54 of the second cup spring 28b does not contact the washer 26, due to the fact that the height (HSP) of the second cup spring 28b at the second plateau 50 is greater than the height (HFP) of the second cup spring 28b at the first plateau 48. Similarly, the first plateau bottom surface 56 of the first cup spring 28a contacts the spindle head 20 but the second plateau bottom surface 60 of the first cup spring 28a does not contact the spindle head 20. In other words, the second plateau bottom surface 60 of the first cup spring is spaced from the spindle head 20.

As shown throughout FIGS. 2-5, each cup spring in the plurality of cup springs 28 is orientated substantially identical to each other. In addition, when the second cup spring 28b is disposed on the first cup spring 28a, at least a portion of the first plateau upper surface 54 of the first cup spring 28a is in contact with the first plateau bottom surface 56 of the second cup spring 28b. Moreover, at least a portion of the upper riser surface 62 of the first cup spring 28a is in contact with the bottom riser surface 64 of the second cup spring 28b. Similarly, at least a portion of the second plateau upper surface 58 of the first cup spring 28a is in contact with the second plateau bottom surface 60 of said second cup spring 28b. It is to be appreciated that if a third cup spring is included in the plurality of cup springs 28, the same contact described above for the first and second cup springs 28a, 28b is also present between the second cup spring 28b and the third cup spring. This relationship occurs because each cup spring included in the plurality of cup springs 28 is orientated substantially identical to each other.

In certain embodiments, at least 80% of the surface area of the first plateau upper surface 54 of the first cup spring 28a is in contact with the first plateau bottom surface 56 of the second cup spring 28b. In addition, at least 80% of the surface area of the upper riser surface 62 of the first cup spring 28a is in contact with the bottom riser surface 64 of the second cup spring 28b. Finally, at least 80% of the surface area of the second plateau upper surface 58 of the first cup spring 28a is in contact with the second plateau bottom surface 60 of the second cup spring 28b. In certain embodiments, the contact percentages described above for each of the three contacts regions exceeds 85, 90, 95, 96, 97, or even 98%. In one embodiment, the contact percentage described above for each of the three contact regions is 100%.

Referring back to the washer 26, the washer 26 defines a bottom washer surface 32 facing the spindle head 20. The bottom surface 32 of the washer 26 may include at least two regions. The first region is adjacent to the valve shaft 16 and is generally referred to as a flat region 34 (see FIGS. 2A and 4A). The flat region 34 is typically substantially parallel with the opposing surface (i.e., the flat surface 25) of the spindle head 20. The flat region 34 is also typically substantially perpendicular to the axis (AX). For the purposes of this disclosure, the terms "substantially parallel" and "substantially perpendicular" mean+/−2° of the true parallel perpendicular. For example, the flat region 34 may be slightly off parallel (+/−2°) with the flat surface 25 of the spindle head 20 when the spindle head 20 is slightly tilted (e.g. upon actuation) with respect to the washer 26. In one embodiment, when the valve shaft 16 includes the shaft support surface 30, at least a portion of the plurality of cup springs 28 is disposed between the shaft support surface 30 and the flat region 34. This arrangement is beneficial when the washer 26 is welded to the valve shaft 16 because it prevents the portion of the plurality of cup springs 28 disposed between the shaft support surface 30 and the flat region 34 of the washer 26 from overly compressing the plurality of cup springs 28 due to the fact that the distance between the shaft support surface 30 and the flat region 34 of the washer 26 is fixed via the welding of the washer 26 to the valve shaft 16.

If included, the second region of the bottom surface 32 is a beveled region 36 located adjacent the flat region 34 and spaced from the valve shaft 16. The beveled region 36 extends oblique relative to the flat surface 25 of the spindle head 20 and oblique relative to the flat region 34 of the bottom surface 32 of the washer 26. In particular, the distance between the beveled region 36 and the flat surface 25 of the spindle head 20 is greater than the distance between the flat region 34 of the washer 26 and the flat surface 25 of the spindle head 20. In addition, the distance between the beveled region 36 and the flat surface 25 of the spindle head 20 continues to increase along the beveled region 36 as the beveled region 36 continues to obliquely extend from and relative to the flat region 34. This particular configuration of the bottom surface 32 of the washer 26 results in the plurality of cup springs 28 being compressed between two parallel surfaces (i.e., the flat region 34 of the washer 26 and the flat surface 25 of the spindle head 20). In other words, this particular configuration of the bottom surface 32 of the washer 26 minimizes contact between the plurality of cup springs 28 with the washer 26 beyond the flat region 34. Said differently, this particular configuration of the bottom surface 32 of the washer 26 isolates the compression of the plurality of cup springs 28 to between the washer 26 and the flat region 34. Controlling the point of compression of the plurality of cup springs 28 is advantageous because it avoids overly compressing the plurality of cup springs 28 and avoids compressing the plurality of cup springs 28 in regions of the plurality of cup springs 28 not specifically designed for compression. For example, the location of compression of the cup spring may be isolated to regions of the cup spring (e.g. the second plateau 50), which is typically more elastic than the other regions (e.g. the first plateau 48) of the cup spring.

Referring still to the benefits of the optional beveled region 36, as described above, typically the spindle head 20 is secured between the valve element 12 and the washer 26 with the washer 26 being coupled (e.g. welded to) the valve shaft 16. In this configuration, the spindle head 20 is secured to the valve shaft 16 by disposing the spindle head 20 between the valve body 14 and the washer 26 and is not typically welded to the valve shaft 16. Thus, when the actuator acts on the spindle 18 to move the wastegate assembly 10 between the first and second positions, the spindle head 20 may tilt a relatively minor amount relative to the washer 26. However, even when the spindle head 20 tilts relative to the washer 26, the beveled region 36 of the washer 26 still prevents or reduces contact between the plurality of cup springs 28 and the washer 26 beyond the flat region 34.

Figure 2A:
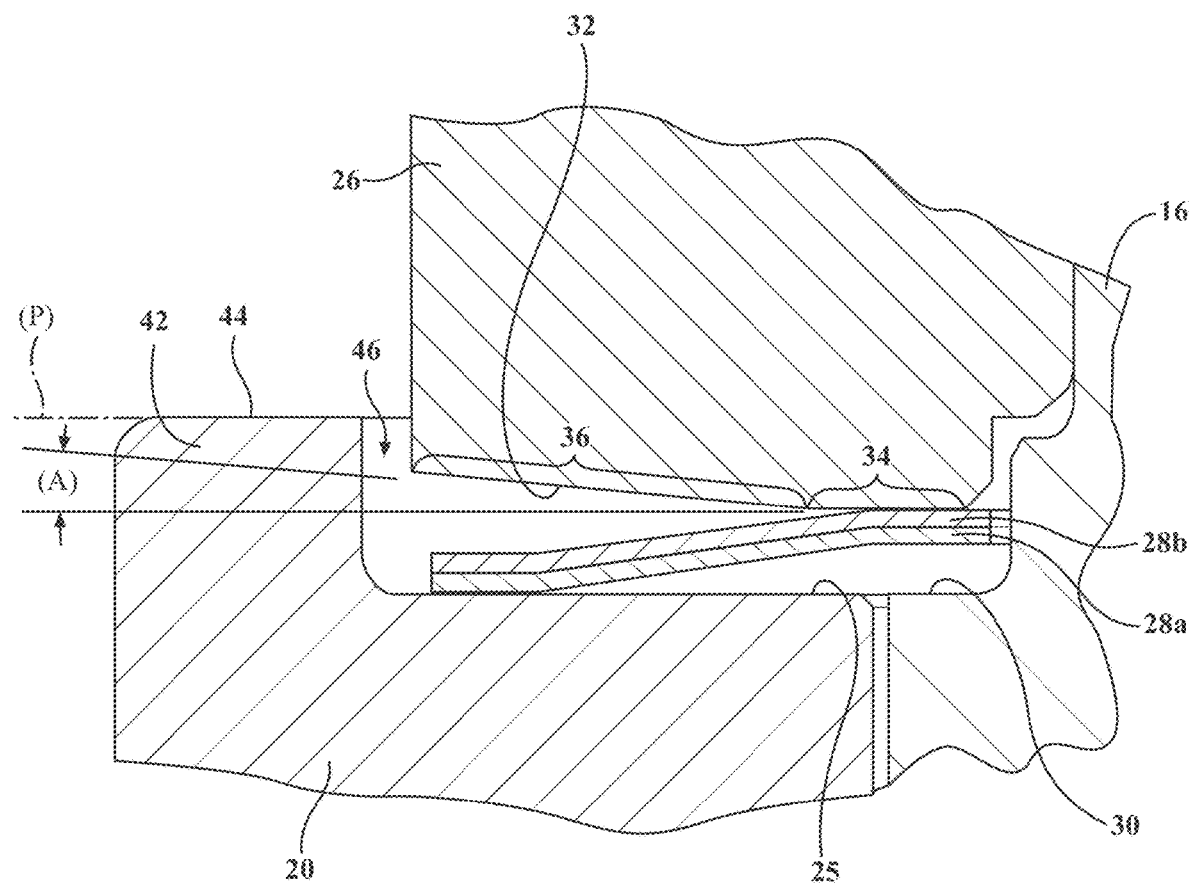
FIG. 2A is an enlarged view of a portion of FIG. 2.

The angle (A) of the beveled region 36 is not particularly limited provided the angle is sufficient for minimizing contact between the washer 26 and the plurality of cup springs 28 beyond the flat region 34, the angle may be from 1 to 15°. Alternatively, the angle (A) may be from 1 to 12, 1 to 9, 1 to 6, 3 to 15, 6 to 15, 9 to 15, 3 to 12, or from about 6 to 9, °. The beveled region 36 and angle (A) are best shown in FIG. 2A. It should also be appreciated that the beveled region 36 of the washer 26 is not observable in FIGS. 1, 3 and 5 due to the perspective view of the washer 26.

In certain embodiments when the plurality of cup springs 28 includes only the first and second cup springs 28a, 28b and each cup spring includes the first plateau 48, the second plateau 50, and the riser 52, the second plateau upper surface 58 of the second cup spring 28b contacts the flat region 34. Whereas, the second plateau upper surface 58 of the first cup spring 28a does not contact the flat region 24, but is instead in contact with the second plateau lower surface 60 of the second cup spring 28b. In addition, the combination of the beveled region 36 extending oblique relative to the flat region 34 and the riser 52 decreasing the height of the cup spring as the riser 52 extends from the second plateau 50 to the first plateau 48 cooperates to limit contact of the plurality of cup springs 28 beyond the flat region 34 of the bottom washer surface 32.

Referring back to the valve shaft 16, as shown in FIG. 2, the valve shaft 16 may also include a third diameter (D3) with the third diameter (D3) being larger than both first and second diameters (D1, D2). When the valve shaft 16 includes the third diameter (D3) the valve shaft 16 may also define a shaft support surface 30 adjacent to the flat surface 25 of the spindle head 20. In this configuration, typically at least a portion of the plurality of cup springs 28 is disposed between said shaft support surface 30 and the flat region of the washer 26. This arrangement is beneficial when the washer 26 is welded to the valve shaft 16 because it prevents the portion of the plurality of cup springs 28 disposed between the shaft support surface 30 and the flat region of the washer 26 from overly compressing the plurality of cup springs 28 due to the fact that the distance between the shaft support surface 30 and the flat region of the washer 26 is fixed via the welding of the washer 26 to the valve shaft 16.

In certain embodiments, when each cup spring in the plurality of cup springs 28 includes the first plateau 48, the second plateau 50, and the riser 52, at least a portion of the second plateau 50 of each cup spring may be disposed between the flat region 34 of the bottom washer surface 32 and the shaft support surface 30.

Figure 4A:
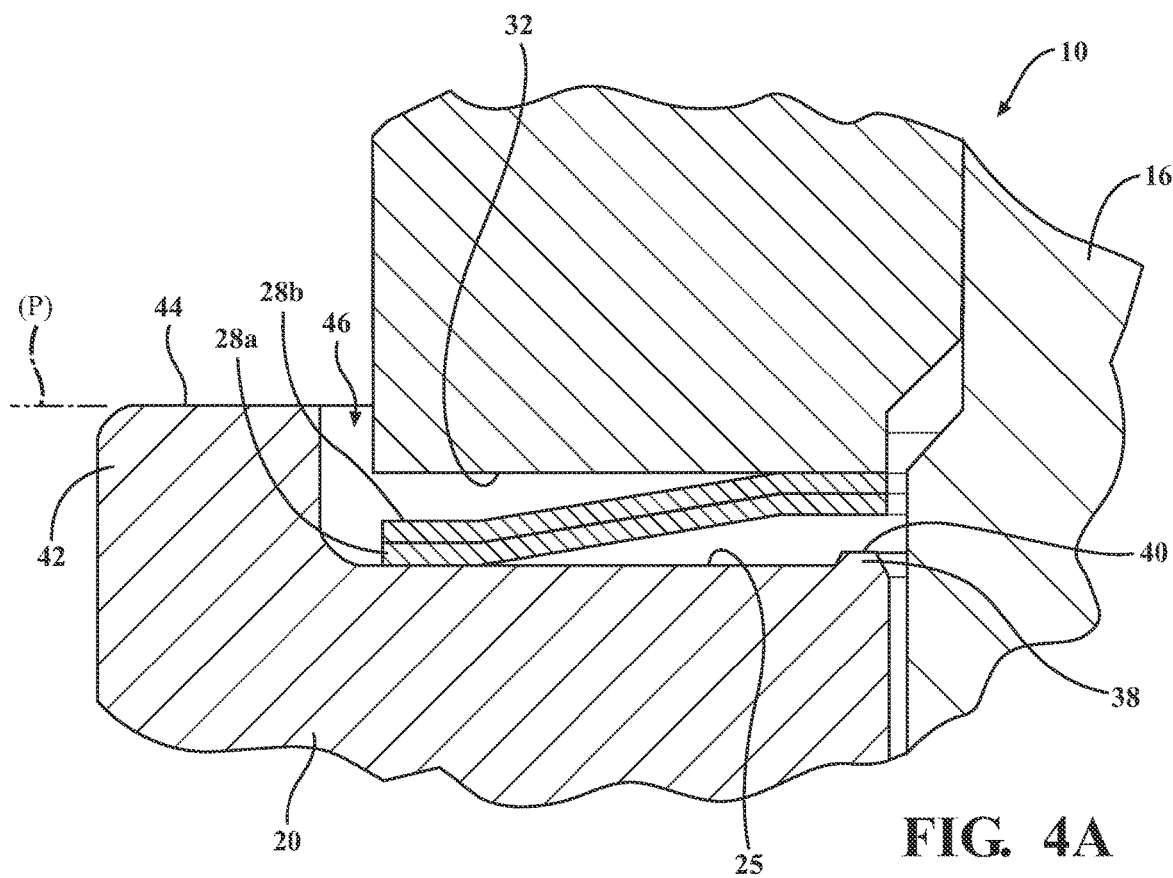
FIG. 4A is an enlarged view of a portion of FIG. 4.

In certain embodiments, such as the embodiment shown in FIGS. 4 and 4A, the spindle head 20 may include an axial stop 38 extending from the flat surface 25 towards the flat region 34 of the washer 26. Typically, the axial stop 38 is located adjacent the inner diameter of the spindle head 20 and adjacent to the valve shaft 16. In this configuration, a portion of the plurality of cup springs 28 is disposed over the axial stop 38. The result of this placement of the plurality of cup springs 28 is that when the plurality of cup springs 28 is compressed between the spindle head 20 and the washer 26, the plurality of cup springs 28 is prevented from being overly compressed (e.g. crushed or flattened) by the axial stop 38. For example, the axial stop 38 prevents the plurality of cup springs 28 from being flattened and prevents plurality of cup springs 28 from "flipping over" (i.e., directionally inverting). Preventing the plurality of cup springs 28 from being overly compressed generally extends the service life of plurality of cup springs 28, particularly when the plurality of cup springs 28 is also exposed to corrosive gas and high temperatures.

The height of the axial stop 38 can be selected based on the particular geometry of the plurality of cup springs 28. For example, a relatively lesser compression of the plurality of cup springs 28 can be achieved by increasing the relative extension of the axial stop 38. In addition, as best shown in FIG. 2A, typically the top surface 40 of the axial stop 38 is substantially parallel with the corresponding bottom surface 32, particularly the flat region 34, of the washer 26. It should be appreciated that the height of the axial stop in FIGS. 4 and 4A is exaggerated for ease of illustration.

The wastegate assembly 10 may also be configured to reduce the exposure of the plurality of cup springs 28 to exhaust gas and high temperatures. As best shown in FIGS. 2A, 3, 4A, and 5, the spindle head 20 may also include a raised lip 42 extending from the flat surface 25 generally parallel to the axis (AX), such that the spindle head 20 defines a courter bore chamber 46. The washer 26 may also be sized such that a diameter of the washer 26 fits within the counter bore chamber 46 to shield the plurality of cup springs 28 from exhaust gas and high temperatures. More specifically, the raised lip 42 extends to a distal end 44 above the flat surface 25 of the spindle head 20 such that a plane (P) can be defined extending from the distal end 44 and perpendicular to the axis (AX). The space below the plane P and above the flat surface 25 of the spindle head 20 defines the counter bore chamber 46. Sizing the washer 26 to have a diameter to fit with the counter bore chamber 46, and fixing the washer 26 such that the bottom washer surface 32 is below the plane (P) results in the raised lip 42 and the washer 26 cooperating to reduce the exposure of the plurality of cup springs 28 to exhaust gas, thereby protecting the plurality of cup springs 28 and extending the service life of the plurality of cup springs 28. For example, as best shown in FIG. 1, the cooperation of the raised lip 42 and washer 26 shield the plurality of cup springs 28 from a side view of the wastegate assembly 10 (i.e., the plurality of cup springs 28 is not observable in FIG. 1 because it resides in the counter bore chamber 46).

Examples

Figure 9:
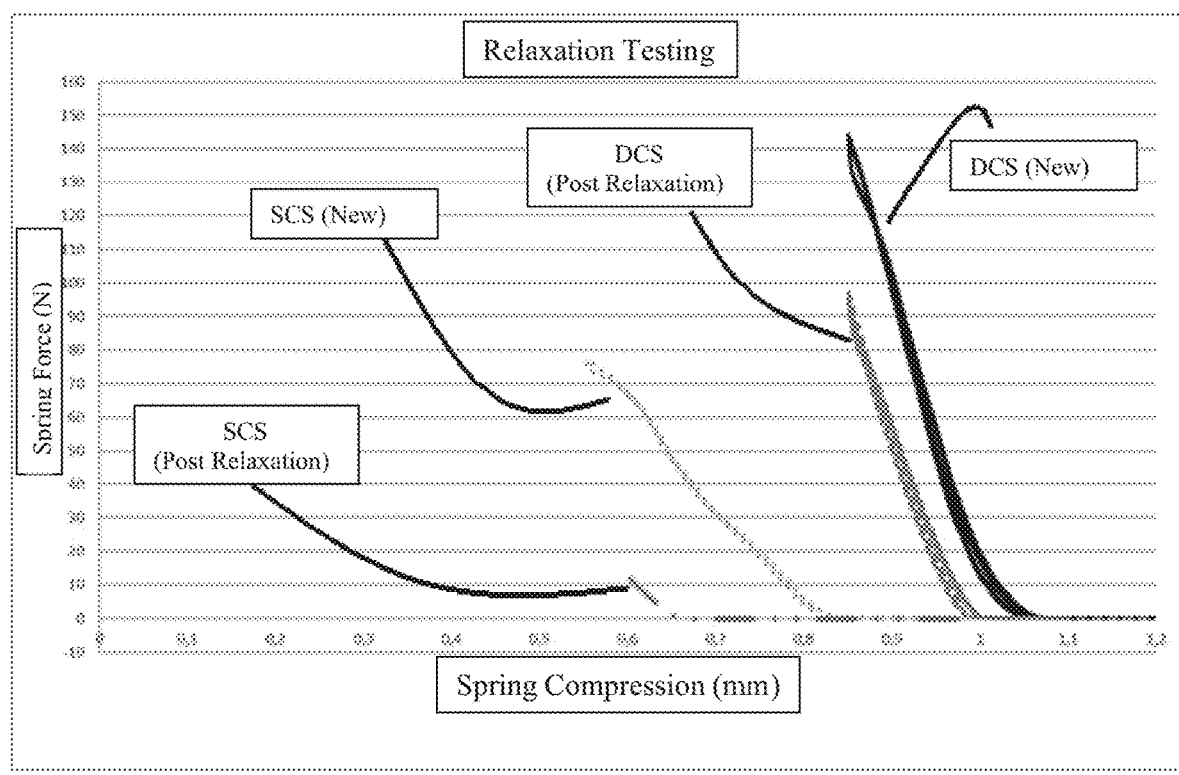
FIG. 9 is a plot presenting relaxation data of a single cup spring and a dual cup spring.

Relaxation testing was performed on a dual cup spring (DCS) and a single cup spring (SCS). The dual cup springs included a first cup spring and second cup spring with the second cup spring orientated substantially identical to the first cup spring and disposed directly on the first cup spring. The relaxation testing was performed using a Zwick & Roel line testing machine (model Z2.5). The relaxation testing data is provided in FIG. 9. The relaxation testing was preformed on both new cup springs and relaxed cup springs. The relaxed cup springs were considered relaxed because the springs had previously undergone the same relaxation testing. The results show that the new dual cup spring outperformed the new single cup spring. Similar, the results show that the relaxed dual cup spring outperformed the relaxed single cup spring. Additionally, the results show that even the relaxed dual cup spring outperformed the new single cup spring.

Max principal testing was also performed on a single cup spring having a thickness of 0.2 mm and a dual cup spring have a collective thickness of 0.2 mm (each cup spring in the dual cup spring had a thickness of 0.1 mm). The height of the single cup spring was 0.8 mm and the collective height of the dual cup spring was 0.8 mm (each cup spring in the dual cup spring had a height of 0.4 mm). The two cup springs included in the dual cup spring were identical. The max principal for the single cup spring was 278 and 359 MPa at a preload of 65N. In stark contrast, the max principal for the dual cup spring was 140 and 176 MPa at a preload of 65N. This data indicates that dual cup spring requires less compression to reach the target pre-force. Additionally, the dual cup spring reaches a much lower stress level compared to the single spring. Thus, the dual cup spring will have a relatively lower degree of relaxation and deformation in a wastegate assembly in comparison to a single cup spring in the same assembly. These results are notable given the fact that the thickness and height of the dual cup spring and the single cup spring were the same. In other words, this testing makes clear that there is an advantage for using a dual cup spring over a larger, single cup spring.

Figure 10:
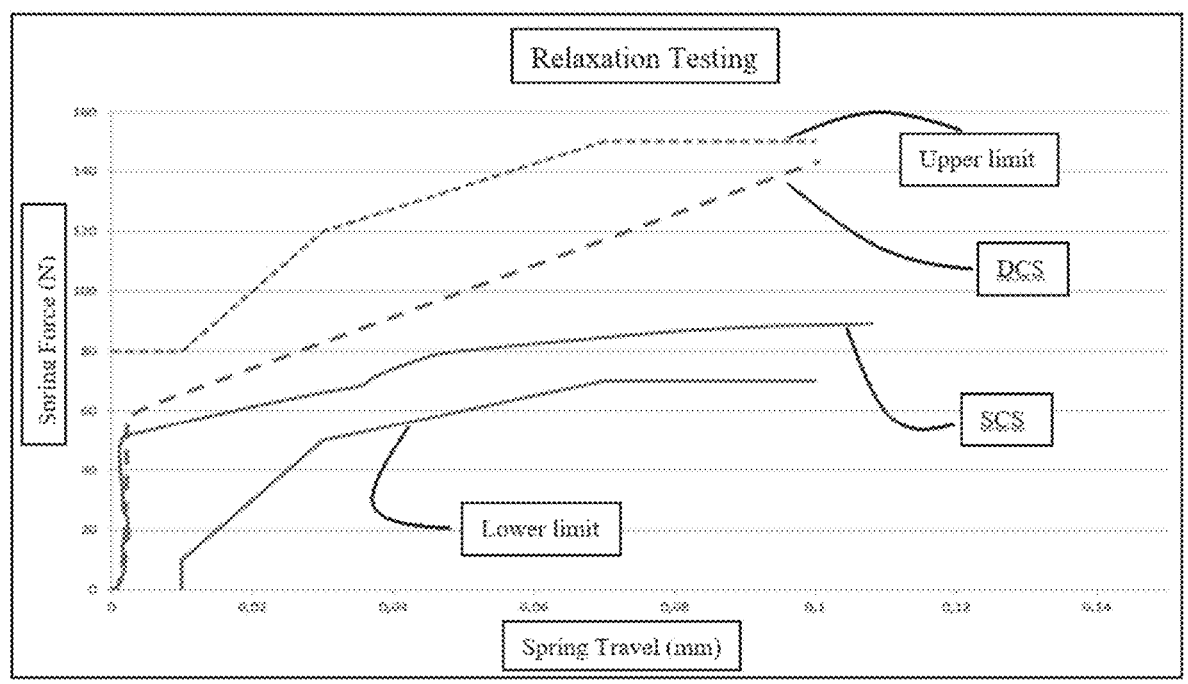
FIG. 10 is a plot presenting force-travel data for a wastegate assembly with a single cup spring and a wastegate assembly with a dual cup spring.

The force-travel was also measured to compare the feasibility of assembling a wastegate assembly with a dual cup spring and a wastegate assembly with a single cup spring. The results of the testing and a corresponding acceptable performance window is shown in FIG. 10. The results demonstrate that the dual cup spring travels less than the single cup spring for a particular force. This makes the dual cup spring an ideal selection for wastegate applications high pulsation indexes.

This disclosure has been described in an illustrative manner, and it is to be understood that the terminology which has been used is intended to be in the nature of words of description rather than of limitation. Many modifications and variations of the present disclosure are possible in light of the above teachings, and the wastegate assembly described above may be practiced otherwise than as specifically described.

What is claimed is:

1. A wastegate assembly for controlling a flow of exhaust gas from an internal combustion engine and through a wastegate channel of a turbocharger, said wastegate assembly comprising:
   a valve element having a valve body and a valve shaft extending away from said valve body, with said valve shaft extending along an axis, and with said valve element moveable between a first position and a second position to control the flow of exhaust gas through the wastegate channel of the turbocharger;
   a spindle having a head defining an opening for receiving said valve shaft for moving said valve element between said first position and said second position;
   a washer coupled to said valve shaft and spaced from said spindle along said axis such that said spindle is disposed between said valve body and said washer for securing said spindle to said valve shaft; and
   a plurality of cup springs disposed between said spindle and said washer;
      wherein said plurality of cup springs comprises a first cup spring and a second cup spring, with said first cup spring supported on said spindle head and said second cup spring disposed directly on said first cup spring in a parallel stacked configuration.

2. The wastegate assembly as set forth in claim 1 wherein said first and second cup springs are identical.

3. The wastegate assembly as set forth in claim 1 wherein said plurality of cup springs consists of said first cup spring and said second cup spring.

4. The wastegate assembly as set forth in claim 1 wherein each cup spring in said plurality of cup springs comprises;
   a first plateau having a first plateau upper surface and a first plateau bottom surface with said first plateau upper surface facing said washer and said first plateau bottom surface opposite said first plateau upper surface and facing said spindle head,
   a second plateau spaced from said first plateau having a second plateau upper surface and a second plateau bottom surface with said second plateau upper surface facing said washer and said second plateau bottom surface opposite said second plateau upper surface and facing said spindle head, and
   a riser extending from said first plateau to said second plateau with said riser having an upper riser surface extending from said first plateau upper surface to said second plateau upper surface and a bottom riser surface extending from said first plateau bottom surface to said second plateau bottom surface.

5. The wastegate assembly as set forth in claim 4 wherein;
   (i) at least a portion of said first plateau upper surface of said first cup spring is in contact with said first plateau bottom surface of said second cup spring;
   (ii) at least a portion of said upper riser surface of said first cup spring is in contact with said bottom riser surface of said second cup spring; and
   (iii) at least a portion of said second plateau upper surface of said first cup spring is in contact with said second plateau bottom surface of said second cup spring.

6. The wastegate assembly as set forth in claim 4 wherein:
   (i) at least 80% of the surface area of said first plateau upper surface of said first cup spring is in contact with said first plateau bottom surface of said second cup spring;

(ii) at least 80% of the surface area of said upper riser surface of said first cup spring is in contact with said bottom riser surface of said second cup spring; and (iii) at least 80% of the surface area of said second plateau upper surface of said first cup spring is in contact with said second plateau bottom surface of said second cup spring.

7. The wastegate assembly as set forth in claim 4 wherein said first cup spring contacts said spindle head but does not contact said washer, and wherein said second cup spring contacts said washer but does not contact said spindle head.

8. The wastegate assembly as set forth in claim 7 wherein said first plateau bottom surface of said first cup spring contacts said spindle head, and said second plateau upper surface of said second cup spring contacts said washer.

9. The wastegate assembly as set forth in claim 4 wherein the height of each cup spring in said plurality of cup springs increases as said riser extends from said first plateau towards said second plateau, such that the height of each cup spring is greater at said second plateau than at said first plateau.

10. The wastegate assembly as set forth in claim 4 wherein said second plateau upper surface of said second cup spring contacts said washer but said first plateau upper surface of said second cup spring does not contact said washer, and wherein said first plateau bottom surface of said first cup spring contacts said spindle head but said second plateau bottom surface of said second plateau of said first cup spring does not contact said spindle head.

11. The wastegate assembly as set forth in claim 4 wherein said valve shaft includes at least a first diameter (D1) and a second diameter (D2), with said first diameter (D1) less than said second diameter (D2) for aligning said spindle head and said washer with said valve shaft.

12. The wastegate assembly as set forth in claim 11 wherein said valve shaft further includes a third diameter (D3) adjacent said washer and defines a shaft support surface adjacent said flat surface of said spindle head, wherein at least a portion of said second plateau of each cup spring in said plurality of cup springs is disposed between said shaft support surface and said flat region of said washer.

13. The wastegate assembly as set forth in claim 1 wherein said spindle head comprises a flat surface facing said washer, and said washer comprises a bottom washer surface facing said flat surface of said spindle head, with said bottom washer surface comprising a flat region and a beveled region, and wherein said flat region of said washer is substantially parallel with said flat surface of said spindle head and configured to contact said plurality of cup springs, and wherein said beveled region extends oblique relative to said flat region for minimizing contact between said washer and said plurality of cup springs beyond said flat region.

14. The wastegate assembly as set forth in claim 13 wherein said beveled region extends obliquely away relative to said flat region at an angle of from 1 to 15°.

15. The wastegate assembly as set forth in claim 1 wherein said spindle comprises an axial stop extending from said spindle head towards said washer with said axial stop configured to prevent over-compression of said plurality of cup springs as said plurality of cup springs is compressed between said washer and said spindle.

16. The wastegate assembly as set forth in claim 1 wherein said spindle head includes a raised lip extending from said flat surface of said spindle to a distal end.

17. The wastegate assembly as set forth in claim 16 wherein said bottom washer surface is located entirely between a plane, which extends from said distal end of said raised lip and perpendicular to said valve shaft, and said flat surface of said spindle head for shielding said plurality of cup springs from exhaust gas.

18. The wastegate assembly as set forth in claim 16 wherein said plurality of cup springs is disposed between said raised lip of said spindle head and said valve shaft.

19. A turbocharger comprising:
a wastegate assembly for controlling a flow of exhaust gas from an internal combustion engine and through a wastegate channel of said turbocharger, said wastegate assembly further comprising:
a valve element having a valve body and a valve shaft extending away from said valve body, with said valve shaft extending along an axis, and with said valve element moveable between a first position and a second position to control the flow of exhaust gas through the wastegate channel of the turbocharger;
a spindle having a head defining an opening for receiving said valve shaft for moving said valve element between said first position and said second position;
a washer coupled to said valve shaft and spaced from said spindle along said axis such that said spindle is disposed between said valve body and said washer for securing said spindle to said valve shaft; and a plurality of cup springs disposed between said spindle and said washer;
wherein said plurality of cup springs comprises a first cup spring and a second cup spring, with said first cup spring supported on said spindle head and said second cup spring disposed directly on said first cup spring in a parallel stacked configuration.

20. A wastegate assembly for controlling a flow of exhaust gas from an internal combustion engine and through a wastegate channel of a turbocharger, said wastegate assembly comprising:
a valve element having a valve body and a valve shaft extending away from said valve body, with said valve shaft extending along an axis, and with said valve element moveable between a first position and a second position to control the flow of exhaust gas through the wastegate channel of the turbocharger;
a spindle having a head defining an opening for receiving said valve shaft for moving said valve element between said first position and said second position;
a washer coupled to said valve shaft and spaced from said spindle along said axis such that said spindle is disposed between said valve body and said washer for securing said spindle to said valve shaft; and
a plurality of cup springs disposed between said spindle and said washer;
wherein each cup spring in said plurality of cup springs comprises:
a first plateau having a first plateau upper surface and a first plateau bottom surface with said first plateau upper surface facing said washer and said first plateau bottom surface opposite said first plateau upper surface and facing said spindle head,
a second plateau spaced from said first plateau having a second plateau upper surface and a second plateau bottom surface with said second plateau upper surface facing said washer and said second plateau bottom surface opposite said second plateau upper surface and facing said spindle head, and
a riser extending from said first plateau to said second plateau with said riser having an upper riser surface extending from said first plateau upper surface to said second plateau upper surface and a bottom riser surface extending from said first plateau bottom surface to said second plateau bottom surface; and wherein
(i) at least 80% of the surface area of said first plateau upper surface of said first cup spring is in contact with said first plateau bottom surface of said second cup spring,
(ii) at least 80% of the surface area of said upper riser surface of said first cup spring is in contact with said bottom riser surface of said second cup spring, and
(iii) at least 80% of the surface area of said second plateau upper surface of said first cup spring is in contact with said second plateau bottom surface of said second cup spring.

* * * * *